United States Patent [19]
Richetti

[11] 4,134,419
[45] Jan. 16, 1979

[54] TRI-COMBINATION SYSTEM
[76] Inventor: Thomas E. Richetti, 1150 Linda Dr., Arroyo Grande, Calif. 93420
[21] Appl. No.: 748,663
[22] Filed: Dec. 8, 1976
[51] Int. Cl.² ............................................ F16K 24/00
[52] U.S. Cl. ................................................. 137/216
[58] Field of Search ............... 137/215, 216; 285/150, 285/153, 154, 155; 134/186

[56] References Cited
U.S. PATENT DOCUMENTS

| | | | |
|---|---|---|---|
| 3,155,106 | 11/1964 | Baron | 137/216 |
| 3,183,923 | 5/1965 | Henrikson | 137/216 |
| 3,512,545 | 5/1970 | Weaver | 137/216 |
| 3,620,241 | 11/1971 | Brown | 137/216 |
| 3,967,638 | 6/1976 | Tondreau | 137/216 |

Primary Examiner—Martin P. Schwadron
Assistant Examiner—A. Michael Chambers
Attorney, Agent, or Firm—Harry W. Brelsford

[57] ABSTRACT

A single housing for insertion in one hole in a sink provides three fluid flows: (a) drinking water (b) dishwater effluent and (c) water treatment effluent. In addition, a vent or air gap to atmosphere is provided at the housing for the two effluents to satisfy code requirement of an air gap between the dishwater and drinking water device, and the sanitary sewer. A vented airspace is also provided between the drinking water pipe and the housing.

4 Claims, 9 Drawing Figures

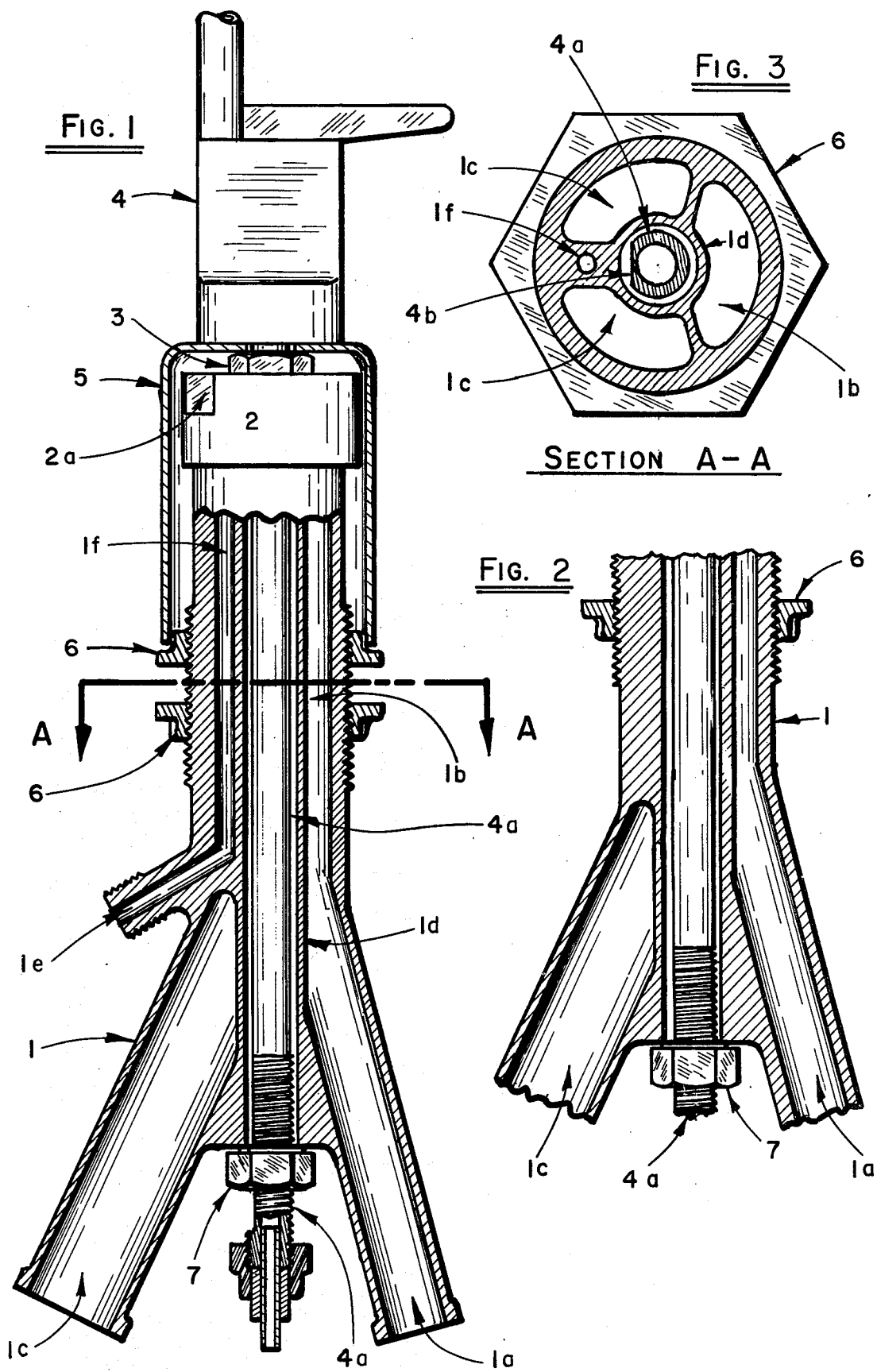

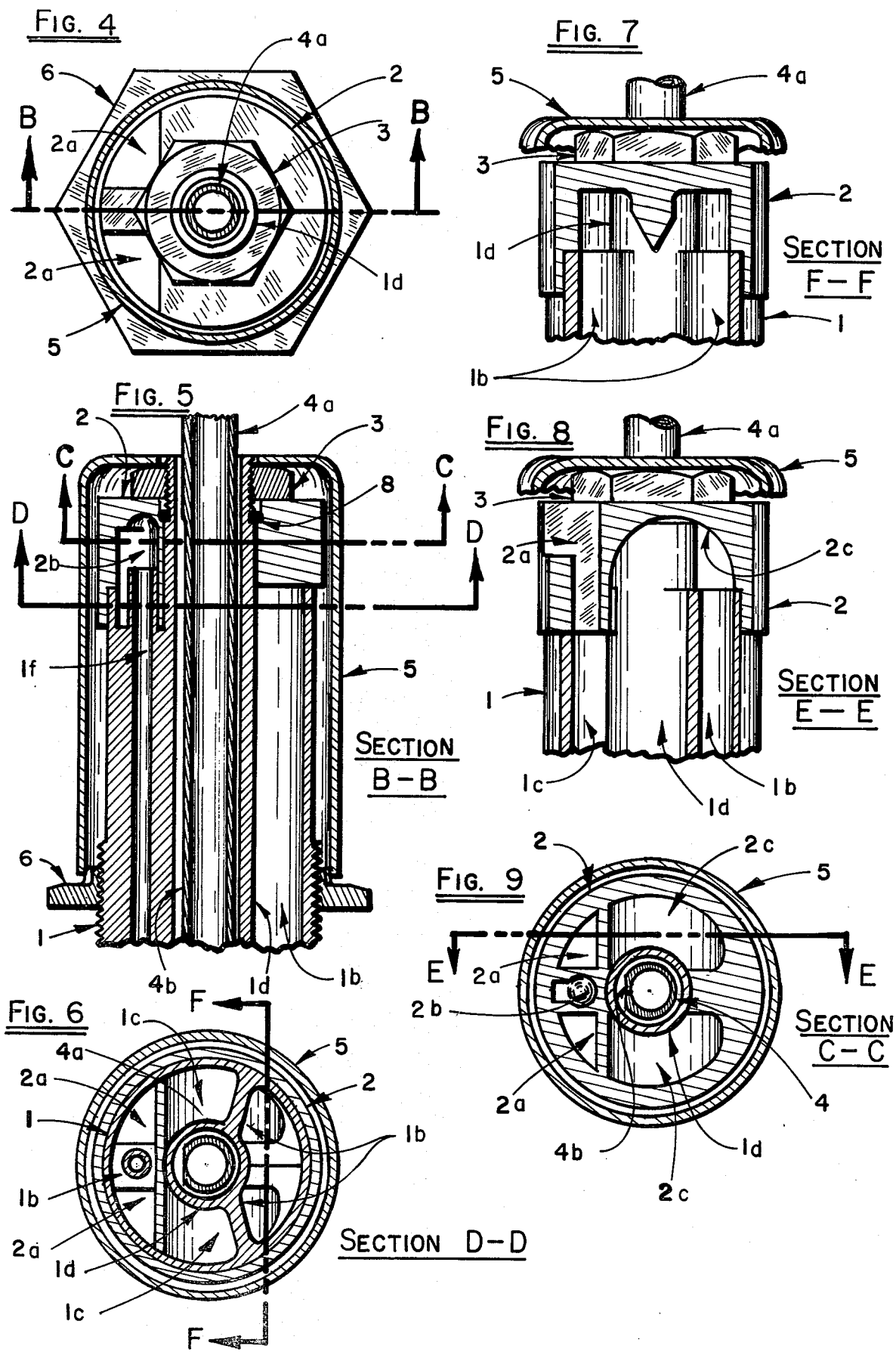

TRI-COMBINATION SYSTEM

BACKGROUND OF INVENTION

Small domestic reverse osmosis units are becoming more in demand in view of an increasing desire for purified water in the home.

The installation of reverse osmosis units in homes are generally preferred under the kitchen sink so that the drinking faucet can be installed at the kitchen sink for convenience. This type of installation requires an additional hole to be drilled in the sink for the product water dispensing valve and a connection made into the sewer line for the reverse osmosis units blowby line. The problems of this type of installation can be many, including added time and cost. There are some dispensing valves being built that include an air gap for the blowby of a reverse osmosis unit, but these do not solve the problems of installation. The need to drill an additional hole in the sink and make an added connection in to the sewer line are still necessary.

PURPOSE OF THE INVENTION

The primary objective of this invention is to provide a method of installing reverse osmosis units in homes to simplify the connections needed for same. This simplification is accomplished by installing said invention in the place of an existing air gap device provided for a dishwasher. This will provide the drain needed for the blowby on the reverse osmosis unit without making an additional connection to the waste pipe coming from the sink. Also provided by said invention will be the dispensing valve for the reverse osmosis units product water, eliminating the need for drilling an additional hole down through the sink for installation of the dispensing valve. The air gap device needed for the dishwasher is also provided for in said invention and the discharge and drain lines for the dishwasher are connected in a standard manner as was the existing air gap device.

The purpose of modifying the invention into a two function apparatus, (a dishwasher air gap and water dispensing valve) is as follows: There are people who have water softeners installed on the hot and cold water in their homes, but desire to have the hard water for drinking, that is filtered by a different means than by softening, such as a carbon filter. This type of system needs only the addition of a dispensing valve in the sink and uses no drain. This would be provided by the modified invention as a two function system.

A brief discription of the several view of the drawing is as follows.

FIG. 1 Central vertical cross section view of invention apparatus in service position.

FIG. 2 Shows modification of apparatus to a two function system. This view is of the central body on a vertical section.

FIG. 3 Horizontal cross section of FIG. 1, showing combination of functions.

FIG. 4 Top view of cap, looking down on apparatus, less dispensing valve and outer cover.

FIG. 5 Vertical cross section of FIG. 4, showing cap assembly.

FIG. 6 Horizontal cross section of cap and upper housing where they interconnect.

FIG. 7 Vertical cross section of cap assembly, showing division point of dishwasher discharge stream.

FIG. 8 Vertical cross section of cap assembly showing curved area used for deflecting discharge from dishwasher.

FIG. 9 Horizontal cross section of cap assembly.

DETAILED DESCRIPTION OF THE DRAWING

Referring now to FIG. 1, the apparatus is shown assembled in an upright position as it would be found when installed for use and is seen to consist of a main body 1 with an inlet passage 1a for incoming effluent from a dishwasher (numbered 1b in its upper part), an inlet passage 1e for incoming blowby (brine) concentrate from a reverse osmosis unit, an outlet passage 1c for discharging effluent downwardly received from the two inlet passages 1a and 1e, a generally central vertical nipple housing 1d, and a cap 2 on the upper end of the body 1.

Referring now to FIGS. 1 and 5, a nipple or hollow tube 4a is inserted into the hollow nipple housing 1d. This nipple 4a is connected to the bottom of a conventional dispensing valve 4, as is customary in the trade. The nipple 4a is inserted from the top into the nipple housing 1d and is secured by a nut 7 at its lower end. This nut 7 holds the nipple 4a and its attached valve 4 in place. The valve 4 holds in place an outer cover 5, which has an air gap with the nut 6. Also shown are two nuts 6 used for installing the apparatus in a service position such as in an opening provided for a fixture in a kitchen sink. These nuts 6 may be adjusted by threaded means on the apparatus body 1 to enable installation in sinks of varied thickness.

Referring now to FIG. 3, this is a horizontal cross section showing the various parts of the apparatus in a close side-by-side relationship, showing the nipple 4a inserted through the central bore of the nipple housing 1d. In combination, the nipple 4a and the nipple housing 1d form two inner walls with a flat 4b to allow atmosphere between said nipple 4a and housing 1d. This structure separates the drinking water inside the nipple 4a from the waste water effluent in other passages. The separation of the waste water effluent in the outlet passage sections 1c from water in nipple 4a is by a double wall having an air space between said nipple 4a and housing 1d open to atmosphere.

It will be noted that the nipple 4a has a flat 4b, and by referring to FIGS. 1 and 5 it will be noted that this extends from the region of the top of the nipple to its bottom end, including the area where nut 7 is threaded on the nipple. Therefore, there is an air passage inside the nut 7 to atmosphere, and the space between the nipple 4a and the nipple housing 1d is vented to atmosphere. This venting to atmosphere insures against a cross-connection from sewage lines to drinking water lines.

Referring to FIGS. 1 and 3, it will be noted that the outlet passage 1c is forked in the region of the osmosis blowby concentrate inlet 1e. The upper fork passages 1c and the dishwasher effluent passage 1b surround the nipple housing 1d. In the part between the two forked passages 1c, there is the blowby passage 1f. It will be noted in FIG. 3 that the three passages 1c, 1c, and 1b are generally in the shape of a doughnut surrounding the nipple housing 1d, but cut into three roughly equal parts. Referring now to FIG. 3, the flow in passage 1b and 1f is upwardly toward the viewer, and this upward flow is diverted at the cap 2 (FIG. 1) into downward flow in the two passage sections 1c, or away from the viewer in FIG. 3. Referring now to FIG. 7, it will be noted that a shaped part of cap 2 divides the upward flow of passage 1b to divert into the two passage sections 1c. Shown in FIG. 5 is a cross-connection 2b in cap 2 that diverts the upward blowby flow in passage 1f into the two passage sections 1c.

Referring now to FIG. 4, this is a top view of the operative cap 2, comprising a nut 3 secured on the nipple housing 1d, just above the top of cap 2, and two air passages 2a in adjacent quadrants of cap 2, each in position above one of the two outlet passage sections 1c. These air passages 2a provide the air gap, the vent to atmosphere.

Referring now to FIG. 5, this shows a vertical cross section of the upper end of the apparatus, showing the cap 2 interconnected with the apparatus body 1, with the nipple housing 1d extending up through the cap 2 to a sufficient height to allow the nut 3 to be attached to the outer surface of the nipple housing 1d just above the cap 2. Also shown, just under nut 3, is an O-ring 8 used as a seal between the cap 2 and the nipple housing 1d. Shown also is the outer chromed cover 5 positioned down over the upper end of the apparatus body 1, the cap 2, and the nut 3, and having a cylindrical body open at the bottom end, with a partially flat top, having an opening in said top that aligns with the nipple housing 1d in the apparatus body 1, allowing the nipple 4a to pass through said opening and into the nipple housing 1d. Also shown in FIG. 5 is the upper end of the osmosis inlet 1f delivering fluid into the opening 2b having a closed top that is partly dome-shaped to divert the upward blowby concentrate from the inlet 1f downward into the outlet passage sections 1c, as shown in FIG. 3.

Referring now to FIGS. 6 and 9, these show a horizontal cross section of the cap 2 and upper end of the apparatus body 1, where they interconnect, and a central horizontal cross section of the cap 2, showing views looking upward into the curved sections 2c of the cap 2, where the effluent leaves the upper end of the inlet passage 1b and is divided by means in the cap 2 into two streams and is diverted back down into the outlet passage sections 1c by the curved surfaces 2c (FIG. 8). The opening 2b is positioned between the two air passages 2a.

Referring now to FIG. 7, this is a view of the cap 2 and upper end of the apparatus body 1, which shows the point at which the dishwasher effluent stream leaves the upper end of the inlet passage 1b and is divided into two streams by means molded into the top underside of the cap 2 in the shape of a V, pointing downward in a position centered above the upper end of the inlet passage 1b and then the effluent stream continues to pass by opposing sides of the nipple housing 1d. Also shown is the cap 2 slipped down sufficiently onto the upper end of the apparatus body 1 to the point where the horizontal surface of the apparatus outer wall engages the horizontal inset provided in the cap 2.

Referring now to FIG. 8, this is a vertical section view of the cap 2, exposing the inner curved surface 2c, beginning where the dishwasher effluent is received in an upward flow from the upper end of the inlet 1b and continuing to the point where effluent is released in a downward flow into the outlet passage sections 1c. Also shown is how the air passages 2a extend vertically through cap 2, having an inner wall shared by the curved surface 2c on the reverse side and having an outer wall shorter than the inner wall creating a stepdown effect where the cap's outer wall encompasses the air passages 2a, and this permits air to enter the drain outlet passage sections 1c and enables the air gap to be accomplished.

The function of the structure is to provide an air gap between the osmosis blowby and the sewer and between the dishwasher outlet and the sewer for health purposes as required by the plumbing codes. The entry of atmosphere is shown in FIGS. 4, 5, 6, 8, and 9. Referring to FIG. 5, it will be noted that there is an air gap between the nut 6 and the lower end of cover 5. Referring to FIGS. 4 and 8, this air flows through passages 2a in the cap 2 to the top of outlet passages 1c. By comparing FIG. 4 with FIG. 3, it will be noted that these air vents 2a are directly over the upper ends of outlet passages 1c. This same air is free to flow to the outlet end of blowby passage 1f (FIG. 5), because it vents the top of both passage sections 1c. This is shown clearly in FIG. 6, where the vents 2a surround blowby passage 1f.

I prefer to make the dispensing valve 4, the nipple 4a, and the outer cover 5 of the apparatus of brass, chrome-plated where needed, but these may be made of other suitable materials. The remaining apparatus, body 1, cap 2, and nuts 6 and 3, may be molded of plastic or other suitable materials.

Referring to FIG. 2, this illustration a modified form of the invention having two functions only, the dishwasher air gap and the drinking water. The effluent passage for the water purification has been omitted. In other respects, this modification is similar to the principal structure.

Having thus described my invention, what I claim as new and useful and desire to protect by U.S. letters patent is as follows.

1. A combination faucet and antisyphon apparatus for discharging two effluents including dishwater and water purification effluent and dispensing drinking water comprising; a body including means to install said body in a single opening in a sink, said body being cylindrical in the central and upper portions and including two inlet passages and one outlet passage in a lower portion of said body, air gap means in said upper portion of said body for venting said effluent inlet passages prior to discharge into said outlet passage, a cap mounted on said upper portion of said body adjacent said in gap means, said inlet passages and outlet passage being in communication with said air gap means, said inlet passages communicating through said air gap means to said outlet passage, a bore extending through said body and said cap, an outer cylindrical cover over said cap and said upper portion of said body, said cover having a top with an opening that aligns with said bore, a valve for dispensing said drinking being disposed above said cover and connected to a tube extending through said bore, thereby defining two walls separating the drinking water conveyed within the tube and the effluents conveyed within the passages, said walls defining between them a space vented to the atmosphere.

2. Apparatus according to claim 1, wherein said outlet passage is divided into two sections in the central and upper portions of said body, said body including an integral portion separating said two sections.

3. Apparatus according to claim 2, wherein said outlet passage sections and said inlet passages encircle said vertical bore in an alternating inlet, then outlet arrangement which allows both inlet passages to be adjacent to both outlet passage sections in the central and upper portions of the body.

4. A combination faucet and antisyphon apparatus for discharging a single effluent including dishwater and dispensing drinking water comprising; a body including means to install said body in a single opening in a sink, said body being cylindrical in the central and upper portions and including one inlet and one outlet passage in a lower portion of said body, air gap means in said upper portion of said body for venting said effluent inlet passage prior to discharge into said outlet passage, a cap mounted on said upper portion of said body adjacent said air gap means, said inlet passage and outlet passage being in communication with said air gap means, said inlet passage communicating through said air gap means to said outlet passage, a bore extending through said body and said cap, an outer cylindrical cover over said cap and said upper portion of said body, said cover having a top with an opening that aligns with said bore, valve for dispensing said drinking water being disposed above said cover and connected to a tube extending through said bore, thereby defining two wall separating the drinking water conveyed within the tube and the effluent conveyed within the passages, said walls defining between them a space vented to atmosphere.

* * * * *